Patented July 17, 1951

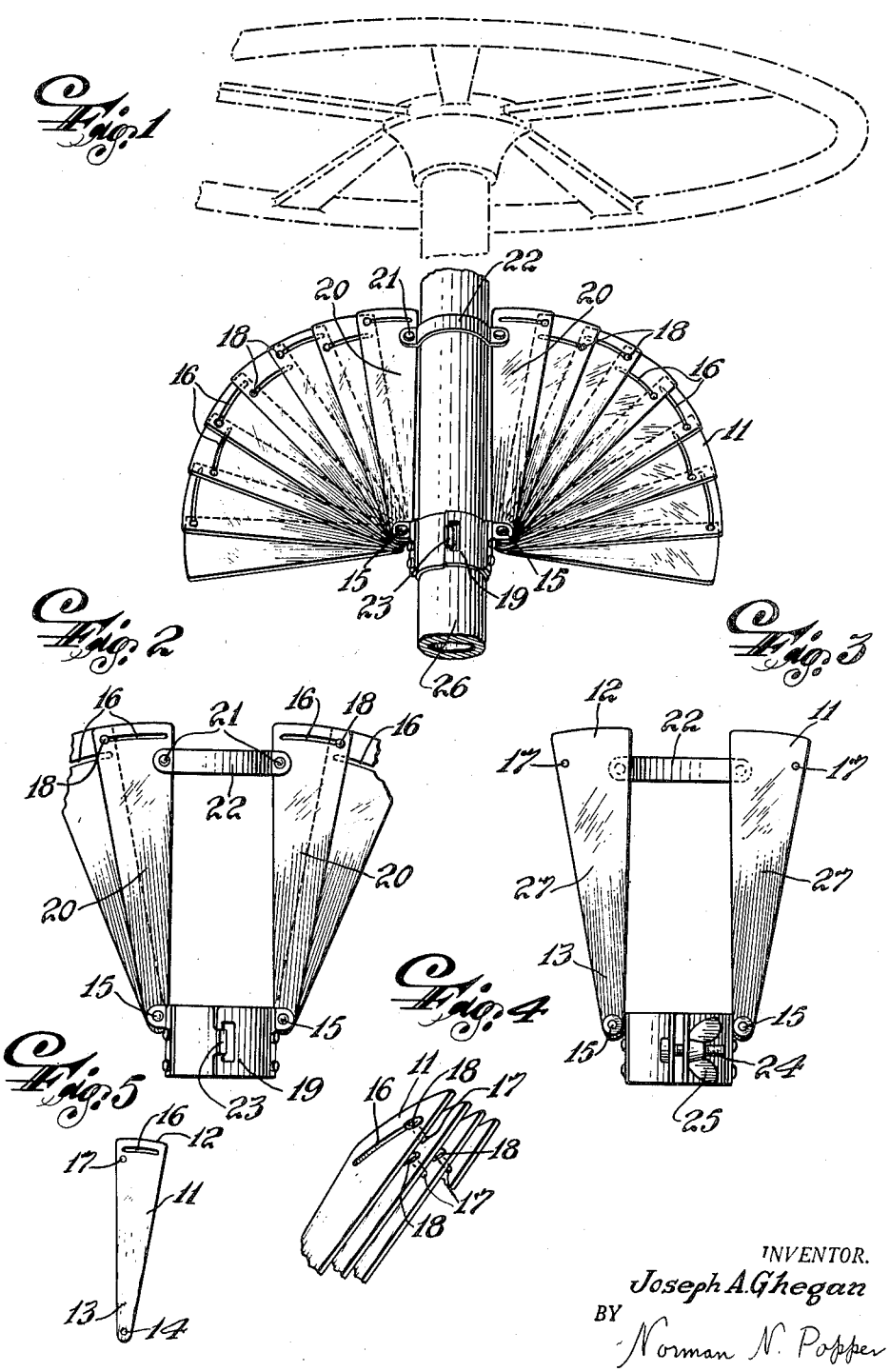

2,560,762

UNITED STATES PATENT OFFICE 2,560,762

SUNSHADE

Joseph A. Ghegan, Irvington, N. J.

Application December 7, 1948, Serial No. 63,909

1 Claim. (Cl. 160—134)

My invention relates generally to sun-shades and specifically to sun-shades for attachment to motor vehicle steering columns.

It is among the objects of my invention to provide a sun-shade which will protect the legs, thighs and abdomen of the driver of a motor vehicle from the heat of the sun, which gains ready access to the person driving a motor vehicle designed with a modern slanting wind-shield.

It is another object of my invention to provide a sun-shade which does not change the external appearance of a motor vehicle or offer wind resistance.

It is yet another object of my invention to provide a sun-shade which is positioned inside a motor vehicle and readily attaches to the steering column.

Still other objects of my invention is to provide a sun-shade which is simple in form, inexpensive to construct, easy to attach and use, durable and readily folded out of the way when not in use.

These objects and advantages, as well as many other objects and advantages are attained by the device shown for illustrative purposes in the appended drawings in which:

Figure 1 is a top view showing my sun-shade open and attached to the steering column of a motor vehicle;

Figure 2 is a partial top view showing several blades only;

Figure 3 is a bottom view showing all blades folded together;

Figure 4 is a view in perspective of several blades, showing the manner in which they are engaged together for cooperative action; and Figure 5 is a view of a single blade.

Referring now to the drawings in detail, my invention provides a series of semaphores or blades 11 which are in the shape of a fan blade. They are wedge-shaped having a wide end 12 and a narrow end 13. The narrow ends 13 are provided with a hole 14. A group of these blades 11 may be brought together and a pin 15 inserted, whereupon they may be made to fan out with the pin 15 as a pivot point.

At the wide end 12, the blades 11 are provided with slots 16. These slots are slightly displaced from each other in alternate blades so that the lug or engaging members 17 may be conveniently attached. Each blade 11 has a lug, rivet or engaging member 17 which has a large head 18. Each lug 17 extends into a slot 16 on the succeeding blade 11 and the head 18 maintains the lug 17 in engagement with the slot, so that the fanning out of a blade 11 causes the next succeeding blade to follow. The reversal of motion of a fanned out blade 11 causes the succeeding blades to close. The pin 15 passes through a lower support 19. The end blade 20 is attached by a rivet 21 (or the like) to an upper support 22. The upper support 22 prevents the blades 11 from drooping as they might do if they were unsupported at one end.

The lower support 19 may be in two parts and connected together by a hinge 23 at one point while a bolt 24 and nut 25 serve to fasten the other ends together and enable the entire device to be affixed to the steering column 26 of a motor vehicle. The end blade 27 need have no slot. All blades are formed of opaque material such as a light metal.

The use and operation of my shade is as follows. It is first attached to the steering column of a motor vehicle as is shown in Figure 2. When the blades are all folded, one upon the other, the end blade 27 is grasped and pulled outward and downward, whereupon the other blades will follow it until maximum spread has been achieved. The same thing is done then with the blades on the other side of the steering column.

When the use of the shade is no longer required, the end blade 27 is merely moved toward the steering column, whereupon the other blades will follow.

The foregoing description and the drawings thereof are intended merely as illustrative of one embodiment of my invention, for many changes may be made in the construction, selection and arrangement of the various parts, all within the scope of the appended claim without departing from the spirit of the invention.

I claim:

A sun-shade comprising a support having two segments connected at one side and means for connecting them at the other side; an assemblage of a plurality of opaque semaphores, a pivotal connection securing the semaphores together at one end and attaching them to the support, a pin at the opposite end of each semaphore, an arcuate slot between the edges of the semaphores engaged with the pin of the adjacent semaphore whereby the semaphores are restricted from pivoting out of overlapping relationship; a corresponding assemblage of a plurality of opaque semaphores similarly secured and connected attached to the opposite side of the support and extendable in the same plane as the first assemblage of semaphores, and another support attached to the first semaphore of each assemblage.

JOSEPH A. GHEGAN.

REFERENCES CITED

The following references are of record in the file of this patent:

UNITED STATES PATENTS

| Number | Name | Date |
|---|---|---|
| 214,912 | Herron et al. | Apr. 29, 1879 |
| 602,967 | Wells | Apr. 26, 1898 |
| 1,450,142 | Dietrick | Mar. 27, 1923 |
| 1,613,364 | Thompson | Jan. 4, 1927 |
| 1,617,981 | Allen | Feb. 15, 1927 |
| 1,719,154 | Wetherbee | July 2, 1929 |
| 2,153,508 | Marchbank | Apr. 4, 1939 |